United States Patent [19]

Hasegawa et al.

[11] Patent Number: 5,304,226

[45] Date of Patent: Apr. 19, 1994

[54] ABRASIVE GRAIN AND MANUFACTURE FOR THE SAME

[75] Inventors: Mitsuru Hasegawa; Tadashi Hiraiwa; Tetsuo Hatanaka, all of Shiojiri, Japan

[73] Assignee: Showa Denko K.K., Tokyo, Japan

[21] Appl. No.: 978,339

[22] Filed: Nov. 18, 1992

Related U.S. Application Data

[60] Division of Ser. No. 845,828, Mar. 6, 1992, Pat. No. 5,192,339, which is a continuation of Ser. No. 474,041, Apr. 25, 1990, abandoned.

[30] Foreign Application Priority Data

Aug. 25, 1988 [JP] Japan .................. 63-211087

[51] Int. Cl.$^5$ .............................................. C09C 1/68
[52] U.S. Cl. ...................................... 51/309; 501/12; 501/153; 501/127
[58] Field of Search .............. 51/309; 501/127, 153, 501/134, 12

[56] References Cited

U.S. PATENT DOCUMENTS

| | | | |
|---|---|---|---|
| 4,314,827 | 2/1982 | Leitheiser et al. | 51/309 |
| 4,518,397 | 5/1985 | Leitheiser et al. | 51/309 |
| 4,623,364 | 11/1986 | Cottringer et al. | 51/309 |
| 4,744,802 | 5/1988 | Schwabel | 51/309 |
| 4,786,292 | 11/1988 | Janz et al. | 51/309 |
| 4,799,938 | 1/1989 | Janz et al. | 51/309 |
| 5,076,815 | 12/1991 | Kunz et al. | 501/134 |
| 5,114,891 | 5/1992 | Kunz et al. | 501/127 |

FOREIGN PATENT DOCUMENTS

| | | |
|---|---|---|
| 0024099 | 2/1981 | European Pat. Off. |
| 0248788 | 12/1987 | European Pat. Off. |
| 56-32369 | 4/1981 | Japan |
| 60-231462 | 11/1985 | Japan |
| 61-254685 | 11/1986 | Japan |
| 61-623364 | 11/1986 | Japan |
| 63-97681 | 4/1988 | Japan |
| 64-11184 | 1/1989 | Japan |

OTHER PUBLICATIONS

"Trends of $Al_2O_3$ Ceramics for Cutting Tools" Tanaka Hiroshi, Precision Instruments, 39(9), 917 (1973).

*Primary Examiner*—Karl Group
*Assistant Examiner*—Deborah Jones
*Attorney, Agent, or Firm*—Sughrue, Mion, Zinn, Macpeak & Seas

[57] ABSTRACT

An abrasive grain for use as a grinding material comprising alpha-alumina crystal particles substantially smaller than 0.5 microns, solidly dissolved with at least one of Ti, Mn, V, Ga, Zn and Rh, and with an a-axis length of the hexagonal unit cell of the alpha-$Al_2O_3$ from 4.75892 to 4.76340 angstroms when measured by a powder X-ray diffraction method, and a density of more than 90% of the theoretical value, and an abrasive grain for a grinding material, comprising alpha-alumina crystal particles substantially less than 0.5 microns, solidly dissolved with at least one of Mg, Ni and Co, and with an a-axis length of the hexagonal unit cell of the alpha-$Al_2O_3$ from 4.75930 to 4.76340 Å when measured by a powder X-ray diffraction method, and a density of more than 90% of the theoretical value, and further, a grinding wheel and coated cloth manufactured from these abrasive grains.

2 Claims, No Drawings

ABRASIVE GRAIN AND MANUFACTURE FOR THE SAME

This is a divisional of application Ser. No. 07/845,828 filed Mar. 6, 1992, now U.S. Pat. No. 5,192,339, which is a continuation of application Ser. No. 07/474,041 filed Apr. 25, 1990 now abandoned.

TECHNICAL FIELD

The present invention relates to an abrasive grain to be used as a durable polycrystalline sintered ceramic grinding material and to its method of manufacture. The grain contains alumina as a base material and is made by means of an improved sol/gel process.

BACKGROUND ART

A manufacturing method of an abrasive polycrystalline sintered ceramic grain for grinding, using high-density alumina ($Al_2O_3$) as a base material and a sol/gel manufacturing process, is well-known. Patent application JPA 56-32369 (corresponding to U.S. Pat. No. 4,518,397 and EP-A-24099) describes that an alumina hydrate may be gelled together with a precursor comprising at least one kind of reforming component, then dried and sintered. The reforming component used in this case includes oxides of Co, Hf, Mg, Ni, Zn and Zr. Patent application JP-A-60-231462 (corresponding to U.S. Pat. No. 4,623,364 and EP- A-152768) describes a sol/gel method for accelerating the manufacture of high-density alumina by adding alpha-alumina seed crystals, which may be added to the sol as a crystal growth control agent comprising oxides of Si, Cr, Mg and Zr.

Patent application JP-A-61-254685 (corresponding to U.S. Pat. No. 4,744,802 and EP-A-200487) states a method for adding alpha-alumina, alpha-ferric oxide, or their precursors into a sol as a nucleating agent, and includes a statement that the gel contains precursors of oxides of Mg, Zn, Co, Ni, Zr, Hf, Cr and Ti.

Although producing a sintered alumina abrasive grain by a sol/gel process yields strong fine abrasive polycrystal grains, the crystal size of the grain is coarse and does not have uniform size without addition. Therefore, the grain is improved by adding reforming components, such as MgO and $ZrO_2$, into the alumina sol material, as described above. However, because low-hardness substances like spinel, are formed in the grain boundary of the polycrystalline abrasive grain, the average hardness and strength of the abrasive grain could be improved even further. Although the hardness of the grain has been addressed to some extent by these methods, further improvements are both possible and desirable.

DETAILED DESCRIPTION OF THE INVENTION

The present invention provides a strong abrasive grain made by combining a micro-crystallizing technology that uses a sol/gel process and a crystal strengthening technology that uses solid solutions.

Upon request from the grinding industry, the applicants of the present invention have developed a method wherein the resulting crystals are both finer and stronger. According to this method, no layer softer than alpha-$Al_2O_3$ is formed in the grain boundary.

Therefore, the present invention provides an abrasive grain, for use as a grinding material, that comprises alpha-alumina crystal particles with a crystal size substantially less than 0.5 microns; the grain is a solid solution with at least one of Ti, Mn, V, Ga, Zn and Rh; the measurement of the "a" axis length of the hexagonal unit cell of alpha-$Al_2O_3$ in the grain is 4.75892 to 4.76340 angstroms (Å) when measured by powder x-ray diffraction; and the density of the grain is more than 90% of the theoretical value.

Furthermore, the present invention provides an abrasive grain, for use as a grinding material, that comprises alpha-alumina crystal particles with a crystal size substantially less than 0.5 microns; the grain consists of a solid-solution containing at least one of Mg, Ni and Co; the value of the "a" axis length of the hexagonal unit cell of Alpha-$Al_2O_3$ in the grain is 4.75930 to 4.76340 angstroms when measured by powder x-ray diffraction; and its density is more than 90% of the theoretical value.

In addition, the present invention provides a method for manufacturing an abrasive grain for use as an alpha-$Al_2O_3$ grinding material; the abrasive grain added before the sol is gelled comprises at least one of the following materials, all of which have an alpha-alumina structure and a particle size substantially less than 2 microns $Ti_2O_3$, $MgO \cdot TiO_2$, $FeO \cdot TiO_2$, $NiO \cdot TiO_2$, $CoO \cdot TiO_2$, $MnO \cdot TiO_2$, $ZnO \cdot TiO_2$, $V_2O$, $Ga_2O_3$ and $R_2O_3$, or an alpha-$Al_2O_3$ solid solution in combination with these elements. The material chosen is added into the alumina sol, the sol is gelled and then sintered at 1,000° C. to 1,400° C.

Furthermore, the present invention provides a grinding wheel and coated abrasive paper which contain the above-mentioned abrasive grain.

$Ti_2O_3$, if used, may be added into the alumina sol as a quadrivalent titanium compound ($TiO_2$, for example), which is gelled and then sintered at 1,000° C. to 1,400° C. in a reducing atmosphere. This is possible because $TiO_2$ is reduced during the sintering to form $Ti_2O_3$. In an ilmenite system, a titanium compound ($Ti(OH)_4$, for example) and a compound of other constituting metals ($Ni(NO_3)_2$, for example) may be added at a molar equivalent per the titanium and the other metal M (nickel, for example). In this case, also, $MO \cdot TiO_2$ is formed during sintering, though it does not constitute 100% of the product.

If particles having alpha-alumina structure are added into the alumina sol as seeds, the energy needed to form alpha-alumina crystal nuclei is spared, and therefore the alpha-alumina crystals can grow at a reduced temperature. As a result, the growth of crystals having undesirable structure, which often occurs at high temperatures, can be avoided. This conserves energy for the crystals to grow epitaxially on the seeds (the added particles) rather than causing the growth of new alpha-alumina crystal nuclei. Accordingly, alpha-alumina crystal particles are more difficult to develop, a uniform particle size is obtained, and the abrasive grain strength is improved. Energy conservation is greatest when using a crystal identical to the deposited crystal. Less energy is conserved when using a crystal having the same structure, and even less energy is conserved when using a crystal having like structure. Crystal deposition and growth is optimized using seed particles having the same alpha-alumina structure as pure alpha-alumina ($Al_2O_3$)

However, the applicants of the present invention have discovered that, in order to produce an abrasive grain with stronger alpha-alumina crystals, it is better to add into the alumina sol particles having an alpha-alumina structure and the like, containing the elements that can be solidly dissolved into the alpha-alumina, rather than to add pure alumina as the seed.

The particles having an alpha-alumina structure include $Ti_2O_3$, $MgO \cdot TiO_2$, $FeO \cdot TiO_2$, $NiO \cdot TiO_2$, $CoO \cdot TiO_2$, $MnO \cdot TiO_2$, $ZnO \cdot TiO_2$, $V_2O_3$, $Ga_2O_3$ and $R_2O_3$, or an alpha-$Al_2O_3$ solid solution with these compounds. The metal ion addition described above does not produce a remarkable improvement in a solid solution. Other oxides of these elements do not form a true solid solution. The amount of the particles added to the solid solution is preferably 0.005 to 2.23 mol %, and more preferably in the range of 0.01 to 1.15 mol %. If the added amount is less than 0.005 mol %, an enhancement in the alpha-alumina crystal strength cannot be expected. If the amount is more than 2.23 mol %, solid solubility of the alpha-alumina crystals is exceeded, causing local crystal deposition in the grain boundary of the alpha-alumina crystals, which causes the formation of soft layers in the grain boundary, and results in an overall decrease in hardness and strength of the abrasive grain. If seeds are added to an extent that enhances the grain strength and does not reduce it, the abrasive grain made according to the present invention has an a-axis length of the alpha-$Al_2O_3$ hexagonal unit cell from 4.75892 to 4.76340 Å when measured by powder x-ray diffraction.

The smaller the crystal size in an alumina sintered abrasive grain, the higher its grinding performance. Generally, however, if a low temperature is used in sintering, the crystal size is small, but not sufficiently dense. The smallness in crystal size alone is not sufficient to improve the grinding properties. The sintering density must also be raised to at least 90% of the theoretical value. The present invention provides such an alumina sintered abrasive grain.

If the density if raised, the sintered alumina abrasive grain becomes stronger. If the crystal size is reduced, the grain withstands the requirements of heavy-duty grinding.

Furthermore, the crystal size should be substantially less than 0.5 microns. Therefore, the size of the seed to be added into the alumina sol must be less than 2 microns. If the seed crystals are small, less material is required, and the characteristics of the abrasive grain product are improved.

In the present invention, at least one of $Ti_2O_3$, $MgO \cdot TiO_2$, $FeO \cdot TiO_2$, $NiO \cdot TiO_2$, $CoO \cdot TiO_2$, $MnO \cdot TiO_2$, $ZnO \cdot TiO_2$, $V_2O_3$, $Ga_2O_3$, and $R_2O_3$, or an alpha-$Al_2O_3$ particle that can be solidly dissolved with the elements contained in these compounds is added into an alumina sol. If compounds other than aluminum are added into an alumina sol in an ionic state, as described in previous inventions and in Japanese patent application JP-A-57-207672, these elements remain in the grain boundaries of the alumina crystals even after drying and sintering. There, they suppress the formation of unusually large crystals, and they do not make the crystals grow epitaxially on the seeds as in the present invention, and they do not make sintered grains comprising small crystals in which these ions are solidly dissolved. In addition, titanium ion forms $TiO_2$ when oxidized in air, and this is deposited at the grain boundaries of the alumina crystals.

The $Ti_2O_3$ used in the present invention, as is well known, is formed only in a non-oxidizing atmosphere or in a vacuum. Therefore, unless it is added in the form of $Ti_2O_3$, it will not behave as intended by the present invention even if the titanium ion is added into the sol, nor will the titanium form a solid solution if it is not sintered in a reducing atmosphere as described above. If $Ti_2O_3$, a meta-stable compound of the same form as alpha-$Al_2O_3$, is oxidized, it forms a stable $TiO_2$ and is deposited at the crystal grain boundary when added into an alumina sol even when in the form of a fine grain, not to mention in the form of an ion. In the present invention, the $Ti_2O_3$ seed is covered by the alumina sol, whereby the compound will not be exposed to an oxidizing atmosphere even in an ordinary process of making alumina sintered abrasive grain. In this way it remains as $Ti_2O_3$, without being transformed into $TiO_2$, and the alumina is then deposited on its surface.

$V_2O_3$ is formed by reducing $V_2O_5$ by hydrogen or carbon, and undergoes the same reactions and produces the same phenomena as in the case of the above $Ti_2O_3$, forming a meta-stable compound.

$MgO \cdot TiO_2$, $FeO \cdot TiO_2$, $NiO \cdot TiO_2$, $CoO \cdot TiO_2$, $MnO \cdot TiO_2$, and $ZnO \cdot TiO_2$ have an ilmenite structure. $FeO \cdot TiO_2$, in particular, is a natural mineral found in large quantities. These compounds can be obtained when the hydroxides or carbonates of each of the metals are reacted with $TiO_2$. For example, when $MgO \cdot TiO_2$ is put into an alumina sol in the form of MgO and $TiO_2$ independently, $MgO \cdot Al_2O_3$ (spinel) is generated preferentially as described above, unless it is added in a well dispersible form (for example, $Mg(OH)_2$ and $Ti(OH)_4$). Therefore, the above metals must be added in the form of $MgO \cdot TiO_2$ (ilmenite compound), for example, as mentioned above.

Measurement accuracy for the lattice constant of alpha-$Al_2O_3$, one of the components of the present invention, is described as follows. The lattice interval, d, of a (330) plane is measured, and the spacing is sextupled to obtain the a-axis length. The diffraction angle of a (330) plane, 2-theta, is 152.4 degrees when $Cuk_\alpha$ is used as the most common x-ray. In the high angle of this extent, $K_{\alpha 1}$ and $K_2$ are completely separated, and the value of 2-theta can be measured up to 0.001° C. by a goniometer. Therefore, lattice interval d can be measured to six significant figures. It is noted that the a-axis length of pure alpha-$Al_2O_3$, which is not in the form of a solid solution, is 4.75890 angstroms.

The grinding wheel, according to the present invention, is made of the above-described abrasive grains and a bonding material, such as a vitrified bond, metal bond, or resin bond. A grinding wheel that uses a vitrified bond is a preferred application of the present invention.

The bond used in the vitrified grinding wheel, generally called a frit, is a carefully proportioned mixture of feldspar, pottery stone, borax and clay and its constituents include $SiO_2$, $B_2O_3$, $Al_2O_3$, $Fe_2O_3$, CaO, MgO, $Na_2O$, and $K_2O$. Such a bond, with a small amount of a starch like dextrin added, is mixed with abrasive grains, formed in a press, dried and fired to produce a vitrified grinding wheel. When the present invention is employed, the firing is perferably performed at 950° C. to 1150° C. so that the crystals of the abrasive grain do not become coarser.

A coated abrasive paper is made of a base material bonded with the abrasive grain using a bond such as a phenol resin bond which is most often used for its excellent abrasion and water resistance. The bonding may be easier if the bond is mixed with resorcinol or its derivatives. Paper, cloth, non-woven cloth and the like are utilized as base materials.

A more detailed explanation of the present invention is set forth below with reference to examples. The present invention is not limited to these examples.

EXAMPLE 1

First, titanium metal powder was mixed with $TiO_2$ and formed into pellets. The pellets were sintered in a vacuum for one hour at 1400° C., pulverized, and the particles classified to obtain fine $Ti_2O_3$ particles for seed having a maximum particle size of 0.5 microns and an average size of 0.2 microns.

Next, 0.03 g of seed was suspended in 20 ml of water acidified to pH 3 by nitric acid, and 4 g of commercial-grade boehmite was added to this suspension to produce a sol. While the sol was maintained at approximately 40° C. for about 24 hours, it was stirred by a magnetic stirrer with a heater to produce a gel. The gel was then dried for 3 days at 100° C. This dry gel was coarsely pulverized to produce particles of less than 1 mm. The particles were places in an alumina crucible and subjected to calcination in a muffle furnace at 750° C. for 120 minutes under a flow of hydrogen, followed by full sintering at 1250° C. for 100 minutes. After being allowed to cool naturally, a sample particle was divided into two pieces, and the exposed face was examined under a scanning electron microscope. Observation revealed that the crystals in the particles had a well-defined size of 0.4 microns. Xylene immersion showed the specific gravity of this sample to be 3.96.

The sample particles were then further pulverized to about 10 microns to measure the a-axis length of the hexagonal unit cell by means of a powder x-ray diffraction process. The particles had an a-axis length of 4.76190 angstroms, larger by $3.0 \times 10^{-3}$ angstroms than pure alpha-$Al_2O_3$.

Next, the sample particle was embedded into a resin, polished to mirror face by grinding, and given an indentation with a load of 500 g using a micro Vickers indenter. The sample developed very few lateral cracks or Palmgvist cracks which can be seen in pure alpha-$Al_2O_3$ sintered particles (this is explained in Ceramics Japan, 20 (1), 12 (1985).) This means that the sample particle has a much greater strength than pure alpha-$Al_2O_3$.

EXAMPLE 2

A sample particle was prepared by the same method as in Example 1, except that 0.6 g of 0.2 micron seed was used, and the seed contained 2.8 wt. % $Ti_2O_3$ in an alpha-$Al_2O_3$ solid solution. The a-axis length of this sample was 4.75930 angstroms, with very few lateral and Palmgvist cracks.

EXAMPLE 3

Mgo and $TiO_2$ were reacted to make $MgO \cdot TiO_2$, which was pulverized, and the resulting particles classified to obtain $MgO \cdot TiO_2$ particles for seed having an average size of 0.2 microns. Using this seed, a sample particle was prepared in the same manner as in Example 1. The a-axis length of this sample was 4.76190 angstroms. This sample also developed very few lateral and Palmgvist cracks under an indentation test using a micro Vickers indenter.

EXAMPLE 4

875 g of commercial-grade nickel carbonate, $NiCO_3 \cdot 2Ni(OH)_2 \cdot 4H_2O$. and 500 g of anatase titanium oxide were put into a polyethylene container together with polyurethane balls of 20 mm in diameter as a stirring medium. These ingredients were mixed in a rotating pot mill rack, then heated to 1250° C. for two hours in a muffle furnace. About 950 g of a reactant were removed and observed under an x-ray diffractometer, by which $NiO \cdot TiO$ having a similar diffraction pattern with alpha-$Al_2O_3$ and a small amount of NiO were identified. The obtained nickel titanate was pulverized in an iron pot mill for four days. The pulverized material was sufficiently adhesive to line the inside wall of the iron pot mill and the surface of the iron balls of its own accord. Consequently, there was very little contamination with iron. However, the material was washed with excess hydrochloric acid for the sake of caution.

Next, the above suspension was decanted to remove the hydrochloric acid, and the material was repeatedly washed with water. After several washings, when the top of the liquid was hardly free of turbidity, the specific surface area of the suspended solids was 80 $m_2/g$. The iron contamination was 0.05% by weight after washing.

To investigate the efficacy of the slurry of the $NiO \cdot TiO_2$ fine powder thus obtained, the slurry was added to 8 kg of commercial-grade boehmite (SB Alumina made by Condea) so as to form a mixture which contained 1% by weight of $NiO \cdot TiO_2$. The total volume of the mixture was 44 liters of water (including the slurry) and 500 ml of 67.5% nitric acid to make an alumina sol. The sol was stirred for about two hours, then heated at 80° C. for 16 hours to produce a gel. The gel was desiccated by maintaining the gel at 120° C. for 7 hours, ground, and passed through a sieve to obtain particles of about 500 to 300 microns. Then, crystallized water was removed from the particles by heating at 600° C. for two hours in a muffle furnace, and the particles were put into a rotary kiln in which the temperature was raised from room temperature to 1300° C. in 1 minute. The sample was kept at 1300° C. for one minute, then treated for 10 hours at 1100° C. The density of the particles at this time was 3.95, or 99% of the theoretical value. The Vickers hardness under a load of 500 g was 2260 $kg/mm^2$.

In addition, to observe the crystal size of particles, the sample was immersed in a 90° C. saturated solution of borax ($Na_2B_4O_7 \cdot 10 \cdot H_2O$) and then etched at 900° C. for 30 minutes. After cooling, the sample was washed with dilute hydrochloric acid to remove the glass layer formed on the surface, and subjected to an SEM observation. SEM photographic observation at a magnification of 20,000 showed that the crystal size of particles ranged from 0.15 to 0.40 microns, with an average particle size of 0.23 microns. No particles larger than 0.5 micron were found.

The particle size after sintering ranged from 350 to 250 microns, which corresponds to abrasive powder #60 in JIS R6001-1973.

EXAMPLE 5

One kilogram of sandy ilmenite as a natural mineral and 1 liter of water were put into an iron pot mill and pulverized for three days using a wet process. Applying the same process as in Embodiment 4 produced a slurry with a solid content of 6.1 mg/ml and a solid specific surface area of 51 $m_2/g$. Sintered particles were obtained by applying the same process as in Example 4, except that the slurry was added to the boehmite at 0.5% by weight (Dry Base). Measurements showed that the micro Vickers hardness was 2210 kg/mm$^2$, and the crystal size was 0.50 microns.

EXAMPLE 6

Except for using 288 g of commercial-grade manganese carbonate ($MnCO_3$) and 200 g of anatase-type titanium oxide as raw materials, the same process as in Example 4 was applied to obtain an $MnO \cdot TiO_2$ slurry with a solid content of 43 mg/ml and solid specific surface area of 102 m$^2$/g. Sintered particles were obtained by the same processes as in Example 4. The micro Vickers hardness of the product was 2120 kg/mm$^2$.

EXAMPLE 7

A small amount of $TiCl_4$ was dissolved into water to obtain a suspension of $Ti(OH)_4$. After by-product HCl was removed using an anion exchange resin, the suspension was added in place of the $Ti_2O_3$ used in Example 1, in an amount equivalent to 0.03 g $Ti_2O_3$ to produce a sol. Thereafter, using the same process as in Example 1, the gel was heated in a hydrogen atmosphere in a furnace, in which the temperature was raised to 800° C. in three hours and from 800° C. to 1300° C. in 17 minutes.

The gel was maintained at 1300° C. for five minutes. Then the heating was stopped and the sample was allowed to cool. The obtained alumina particles had approximately the same characteristics as those obtained in Example 1.

EXAMPLE 8

A small amount of $TiCl_4$ and $Ni(NO_3)_2 \cdot 6H_2O$ were dissolved in water at an equivalent molar ratio. Sintered alumina particles were made with the same process as in Example 4, except that an amount of the solution equivalent to the amount of $NiO \cdot TiO_2$ in the $NiO \cdot TiO_2$ fine powder slurry in Example 4, was added as $NiO \cdot TiO_3$. Although there was nonuniformity in the properties of the particles, the particles showed, on average, approximately the same characteristics as those obtained in Example 4. Table 1 shows the characteristics of abrasive grains obtained in Examples 1 through 8.

TABLE 1

| Example | Seed | Density (g/cm$^3$) | Crystal size (microns) | Hv (500) (kg/mm$^2$) |
|---|---|---|---|---|
| 1 | $Ti_2O_3$ | 3.96 | 0.4 | 1920 |
| 2 | $Ti_2O_3$ 2.8% solid solution alumina | 3.96 | 0.3 | 2000 |
| 3 | $MgO \cdot TiO_2$ | 3.96 | 0.5 | 2080 |
| 4 | $NiO \cdot TiO_2$ | 3.95 | 0.23 | 2260 |
| 5 | $FeO \cdot TiO_2$ | 3.97 | 0.5 | 2210 |
| 6 | $MnO \cdot TiO_2$ | 3.96 | 0.5 | 2120 |
| 7 | $Ti(OH)_4$ | 3.96 | 0.4 | 1950 |
| 8 | $NiO \cdot TiO_2$ | 3.96 | 0.5 | 2210 |

Note: Crystal size according to SEM photographs.
Hv (500): Vickers hardness at a load of 500 g.
Particle size of abrasive grain: #24

EXAMPLE 9

An alpha-$Al_2O_3$ abrasive grain was made using the same process used for $NiO \cdot TiO_2$ in Example 4, except that 470 g of marketed CoO was used as a cobalt source and sintering for seed synthesis was carried out in an argon atmosphere. The characteristics of the grain are shown in Table 2.

EXAMPLE 10

Using commercial-grade $V_2O_5$ as a raw material, $V_2O_3$ was obtained by heating a hydrogen atmosphere at 800° C. for one hour. An alpha-$Al_2O_3$ abrasive grain was made using the same process as in Example 1. The characteristics of the grain are shown in Table 2.

EXAMPLE 11

Commercial-grade $Ga_2O_3$ was pulverized in a pot mill made of zirconia, classified according to size using water as a classifying medium, and a slurry of less than 0.1 microns was obtained. An alpha-$Al_2O_3$ abrasive grain was made using the same process as in Example 1. The characteristics of the grain are shown in Table 2.

EXAMPLE 12

An alpha-$Al_2O_3$ abrasive was made using the same process as in Example 11, commercial-grade $R_2O_3$ was used. The characteristics of the grain are shown in Table 2.

EXAMPLE 13

An alpha-$Al_2O_3$ abrasive grain was made using the same process as in Example 4, except that 510 g commercial-grade ZnO was used as a zinc source. The characteristics of the grain are shown in Table 2.

TABLE 2

| Example | Seed | Density (g/cm$^3$) | Crystal size (microns) | Hv (500) (kg/mm$^2$) |
|---|---|---|---|---|
| 9 | $CoO \cdot TiO_2$ | 3.96 | 0.4 | 2000 |
| 10 | $V_2O_3$ | 3.96 | 0.5 | 2000 |
| 11 | $Ga_2O_3$ | 3.95 | 0.5 | 1900 |
| 12 | $Rh_2O_3$ | 3.96 | 0.5 | 1900 |
| 13 | $ZnO \cdot TiO_2$ | 3.96 | 0.4 | 2100 |

Note: See Notes of Table 1

REFERENCE EXAMPLE 1 (Abrasive grain described in Japanese patent application 56-32369)

An alumina abrasive grain containing MgO (particle size #60) was made using the same process as in Example 21, which is described in Japanese patent application 56-32369. The abrasive grain has the following characteristics:
MgO content: 6%
Hardness Hv(500): 1410 kg/mm$^2$ Density: 3.61 g/cm$^2$
Crystal size: 1 to 3 microns REFERENCE EXAMPLE 2 (Abrasive grain described in Japanese patent application JP-A-60-231462)

Two hundred grams of pseudo-boehmite of SB Pural Alumina (marketed by Condea) and 1.5 liters of water were mixed in a beaker. Next, to produce a sol, 0.30 liters of $HNO_3$ (3.6% by weight) were added to yield a solution having a pH of 2. Then, 7 kg of alumina balls and 1.5 liters of water were put into a 7.3 liter alumina pot which was rotated for 96 hours so that the alumina balls could grind themselves. As a result, a slurry was obtained containing particles from the alumina balls produced during the grinding operation. The specific surface area of these particles was 75 m$^2$/g.

Next, the slurry was added to the alumina sol in an amount such that the particles constituted 1.5% by weight of the alumina ($Al_2O_3$). After two hours of stirring, the sol was transferred to a vat, and dried first at 80° C. for 48 hours, then at 120° C. for 24 hours. After drying, the dry gel was pulverized in a mortar and sieved to a maximum particle size of 500 microns and a minimum size of 350 microns. The sieved dry gel was treated at 750° C. for one hour to remove the $NO_x$ contained in the nitric acid, and then sintered in a rotary kiln at 1400° C. for one minute. The time taken to raise the temperature to 1400° C. was 15 minutes.

The particle size of the sintered abrasive grain was 0.2 to 0.5 microns, with an average size of 0.3 microns; the Vickers hardness at a load of 500 g was 2230 kg/mm$^2$; and the density was 3.89 g/cm$^3$, or 98% of the theoretical density.

REFERENCE EXAMPLE 3 (Abrasive powder described in Japanese patent application JP-A-61-254685)

The abrasive powder was made by the method described in Japanese patent application JP-A-61-254685. The abrasive grain had the following characteristics:
Density: 3.92 g/cm$^3$, Crystal size: 0.5 microns
Hardness HV (500): 2120 kg/mm$^2$

EXAMPLE 14

Thirteen parts of borosilicate frit (a vitrified grindstone bond), two parts of dextrin, and 2.5 parts of water were mixed with 100 parts of abrasive grain #60 in Example 4. The borosilicate frit used was composed of 70% $SiO_2$, 7% $Al_2O_3$, 18% $B_2O_3$, 4.0% $Na_2O \cdot K_2O$, and 0.5% $CaO \cdot MgO$. After mixing, the material was formed in a press. The formed material, comprised of 45% abrasive grain, was dried at 110° C. for 20 hours. The material was cooled, with especially slow cooling through 500° C. and 600° C.

Thus, a vitrified grinding wheel was produced, with a bonding grade of K as specified in JIS R6210. The size of the grains in the grinding wheel of this Example, corresponding to the abrasive grain in Example 4, was 200×19×76.2 mm.

REFERENCE EXAMPLES 4 AND 5

In relation to the #60 abrasive grain in Example 2 and the #60 single crystal alumina abrasive grain 32A made by Norton, Inc., vitrified grinding wheels measuring 200×19×76.2 mm were made using the same process as in Example 14, and are named as reference samples.

EXAMPLE 15

The performances of the vitrified grinding wheels in Example 14 and Reference samples 4 and 5 were evaluated under the following test conditions:

TABLE 3

| Test Conditions | |
|---|---|
| Machine | Okamoto Heiken, CFG-52 (3.7 kw) |
| Grinding system | Plunge grinding, down cut, manual cut, |
| Grinding material | SKD-1 (HRC 60) $L_{100} \times h_{50} \times t_{10}$ |
| Grinding Wheel surface speed | 2000 m/min |
| Table speed | 20 m/min |
| Cut-in size: | $\Delta^R$20 micron/pass |
| Total cut-in size | 5 mm |
| Grinding width | 10 mm |
| Spark-out | 1 pass |
| Grinding oil | Dry type (no oil used) |
| Dressing condition: | Single stone diamond dresser |
| Cut-in size: | $^R$20 micron/pass |
| Total cut-in size: | $\Delta$0.2 mm/r.o.w. |
| Spark-out: | None |

Table 4 shows values for the grinding ratio, maximum electric power consumption (value excluding no-load power(0.4 kW)), and surface roughness.

TABLE 4

| Sample No. | Grinding ratio (mm$^3$/mm$^3$) | Maximum Consumption power (KW/cm) | Surface roughness ($M_RZ$) 1 = 2.5 mm N = 3 |
|---|---|---|---|
| Example 14 | 47 | 1.1 | 15 |
| Reference Example 4 | 35 | 1.3 | 18 |
| Reference Example 5 | 7 | 1.7 | 20 |

As Table 4 shows, the abrasive grain of the present invention has six times the grinding ratio of References Example 5 (the single crystal alumina abrasive grain 32A that is available on the market) and has remarkably higher values than Reference Example 4 (the grinding wheel using a trace grade abrasive grain as described in Japanese patent application JP-A-60-231462). The grinding performance is greatly improved compared to conventional products. In spite of the improved grinding performance, the maximum power consumption is lower than Reference Examples 4 and 5, and the surface roughness is several grades better than the Reference Examples. In addition, the burn of work piece, which occurs very frequently in Reference Example 5 and relatively frequently in Reference Example 4, did not occur at all in Example 14. The product of the present invention is an abrasive grain and a grinding wheel unsurpassed by any conventional product.

EXAMPLE 16

The parts of resorcinol were dissolved into ten parts of ethanol, then added to 100 parts of the abrasive grain of Example 14. This mixture was dried at 100° C. for one hour to remove ethanol by evaporation.

The phenol resin bond BRL-2867 (about 70 wt. % solid, made by Showa Kobunshi Co.) was evenly coated on a compressed non-woven fabric base material at a rate of 100 g/m$^2$, and then the coated grinding materials were spread out and excess material removed. 250 g/m$^2$ of grinding material were deposited on the base material. The coated cloth was dried at 80° C. for 4 hours. Subsequently, the bond was coated evenly at a rate of 200 g/m$^2$, then dried at 80° C. for four hours. The temperature was then raised from 80° C. to 135° C. in two hours, retained at 135° C. for 30 minutes, and grinding cloths were thus obtained.

REFERENCE EXAMPLES 6 AND 7

Using the abrasive grain in Comparisons 1 and 2, grinding cloths using the non-woven fabric base material were made using the same process as in Example 16, and are named Reference Examples 6 and 7.

EXAMPLE 17

The grinding cloths in Example 16 and Reference Examples 6 and 7 were cut into 180 mm in diameter discs, then used as dry grinders under the following test conditions.

TABLE 5

| Test conditions | | |
|---|---|---|
| Sander: | Hitachi PHD-180C | |
| Grinding time: | 1 min. × 10 grindings | |
| Ground material: | (a) SPC | 10 × 250 × t |
|  | (b) SUS 304 | 9 × 250 × t |

TABLE 5-continued

| Test conditions | |
| --- | --- |
| Load: | 3 lbs. |

The grinding values are shown in Tables 6 and 7.

TABLE 6

| | Grinding SPC | | |
| --- | --- | --- | --- |
| Sample No. | Initial grinding amount (g/min) | 9 to 10 minutes grinding amount (g/min) | Total grinding amount (g) |
| Example 16 | 22.3 | 5.2 | 128.0 |
| Reference Example 6 | 15.5 | 2.1 | 67.9 |
| Reference Example 7 | 19.0 | 3.3 | 96.1 |

TABLE 7

| | Grinding SUS 304 | | |
| --- | --- | --- | --- |
| Sample No. | Initial grinding amount (g/min) | 9 to 10 minutes grinding amount (g/min) | Total grinding amount (g) |
| Example 16 | 6.1 | 2.5 | 33.7 |
| Reference Example 6 | 3.6 | — | 5.7 |
| Reference Example 7 | 4.9 | — | 6.2 |

The reason Table 7 lacks figures for 9 to 10 minutes grinding amount in Reference Examples 6 and 7 is that the ground materials started a burn in four minutes, the ground amount had fallen to an extremely low value, and the grinding therefore had to be stopped.

As Table 6 shows, when the ground material was cold-rolled steel SPC, the performance of the grinding cloth of the present invention was 1.3 to 1.9 times the total grinding amount of Reference Examples 6 and 7 (a grinding cloth using trace grade abrasive grain as described in Japanese patent application 60-231462). When the ground material was SUS 304, the total ground amount was 5.4 to 6.1 times that of the conventional products—a remarkable improvement.

POSSIBILITIES FOR INDUSTRIAL USE

The abrasive grain of the present invention uses alpha-alumina, the crystal size of which is finer than the sintered alumina abrasive grain conventionally used. Increasing the strength of the crystals enhanced the strength of the abrasive grain, greatly improving its utility for heavy-duty or precision grinding.

Furthermore, the grinding wheel and coated cloth using the abrasive grain of the present invention showed better grinding performance, thus greatly contributing to its potential for industrial use.

What is claimed is:

1. A process for manufacturing an alpha-$Al_2O_3$ abrasive grain comprising the steps of:
    adding particles of at least one compound selected from the group consisting of $Ti_2O_3$, $MgO\cdot TiO_2$, $FeO\cdot TiO_2$, $NiO\cdot TiO_2$, $CoO\cdot TiO_2$, $MnO\cdot TiO_2$, $ZnO\cdot TiO_2$, $V_2O_3$, $Ga_2O_3$, and $Rh_2O_3$, wherein the particles have an alpha-$Al_2O_3$ structure and a size of substantially less than 2 microns, into an alumina sol;
    gelling the sol; and
    sintering the gel at a temperature of 1000° C.–1400° C.

2. A process for manufacturing an alpha-$Al_2O_3$ abrasive grain comprising the steps of:
    adding particles of alpha-$Al_2O_3$ solidly dissolved with at least one compound selected from the group consisting of $Ti_2O_3$, $MgO\cdot TiO_2$, $FeO\cdot TiO_2$, $NiO\cdot TiO_2$, $CoO\cdot TiO_2$, $MnO\cdot TiO_2$, $ZnO\cdot TiO_2$, $V_2O_3$, $Ga_2O_3$, and $Rh_2O_3$, wherein the particles have an alpha-$Al_2O_3$ structure and a size of substantially less than 2 microns, into an alumina sol;
    gelling the sol; and
    sintering the gel at a temperature of 1000° C.–1400° C.

* * * * *